(12) United States Patent
Bohin et al.

(10) Patent No.: US 6,369,184 B1
(45) Date of Patent: Apr. 9, 2002

(54) SILICONE COMPOSITION FOR COATING TEXTILE SUBSTRATES

(75) Inventors: Fabrice Bohin, Lyons; Alain Pouchelon, Meyzieu, both of (FR)

(73) Assignee: Rhodia Chimie, Boulogne Billiancourt Cedex (FR)

( * ) Notice: Subject to any disclaimer, the term of this patent is extended or adjusted under 35 U.S.C. 154(b) by 0 days.

(21) Appl. No.: 09/230,754

(22) PCT Filed: Jul. 3, 1997

(86) PCT No.: PCT/FR97/01194

§ 371 Date: Sep. 24, 1999

§ 102(e) Date: Sep. 24, 1999

(87) PCT Pub. No.: WO98/05723

PCT Pub. Date: Feb. 12, 1998

(30) Foreign Application Priority Data

Aug. 2, 1996 (FR) .............................. 96 09972
Apr. 18, 1997 (FR) .............................. 97 05174

(51) Int. Cl.$^7$ ................................................ C08G 77/08
(52) U.S. Cl. ............................. 528/15; 528/31; 528/32; 528/39; 8/DIG. 1; 8/115.62; 8/115.64
(58) Field of Search ............................. 528/15, 31, 32, 528/39; 8/DIG. 1, 115.62, 115.64

(56) References Cited

U.S. PATENT DOCUMENTS 5,658,674 A * 8/1997 Lorenzetti et al. .......... 428/447

FOREIGN PATENT DOCUMENTS

| EP | 0 681 014 | 11/1995 | ......... C09D/183/04 |
| EP | 0 718 432 | 6/1996 | ......... D06M/15/643 |
| EP | 718 432 | * 6/1996 | |

* cited by examiner

Primary Examiner—Margaret G. Moore

(57) ABSTRACT

A silicone composition and the uses thereof, particularly as a coating on an airbag for protecting the occupant of a vehicle in the event of a collision, are disclosed. The aim is to provide a silicone composition suitable for coating onto the inner surface of the airbag while significantly reducing the weight of the resulting coating layer to form a protective coating having enhance high-temperature, mechanical and substrate-adhesion properties. Said aim is achieved in that the composition is free of reinforcing mineral fillers and consists of a mixture of (1) at least one polyorganosilocane with alkenyl groups bound to the silicon; (2) at least one polyorganosiloxane with hydrogen atoms bound to the silicon; (3) a cross-linking catalyst; (4) an adhesion promoter comprising (4.1) at least one alkoxylated organosilane, (4.2) at least one epoxy-functional organosilicon compound, and (4.3) at least one metal chelate and/or metal alkoxide wherein the metal is selected from the group which consists of Ti, Zr, Ge, Li, Mn, Fe, Al and Mg; (5) at least one polyorganosiloxane resin; and (6) optionally at least one cross-linking inhibitor.

4 Claims, No Drawings

SILICONE COMPOSITION FOR COATING TEXTILE SUBSTRATES

This application is an application under 35 U.S.C. Section 371 of International Application Number PCT/FR97/01194, filed on Jul. 3, 1997.

The general field of the invention is that of cold-curing silicone compositions, in particular those of the two-component type (RTV II), which crosslink by hydrosilylation or polyaddition in order to produce a thin-film elastomer. These crosslinked compositions are, among others, suitable as a coating, for example for protection or for mechanical reinforcement, on various substrate made of textile material, such as woven, knitted or non-woven fibrous substrates, for example.

Such silicone coatings are generally obtained by coating the substrate, followed by curing, which proceeds by the polyaddition of unsaturated (alkenyl, e.g. Vi—Si) groups of one polyorganosiloxane onto hydrogens of the same or of another polyorganosiloxane.

These silicone compositions have found a major outlet in the coating of flexible—woven, knitted or non-woven—materials used for the manufacture of bags for the individual protection of the occupants of vehicles, also called airbags.

For more details about airbags, reference may be made, in particular, to French Patent FR-A-2,668,106.

The present invention also relates to the application of the silicones, e.g. (RTV II), in the manufacture of such airbags.

Conventionally, the latter are formed from a fabric made of synthetic fibre, for example made of polyamide (Nylon) ®, covered on at least one of these sides with a layer of an elastomer of the chloroprene type. The presence of such a protective layer or coating is necessary because of the fact that the gases released by the gas generator (for example: carbon monoxide, $NO_x$) in the event of an impact are extremely hot and contain incandescent particles capable of damaging the Nylon® bag. The inner protective layer of elastomer must therefore be particularly resistant to high temperatures and to mechanical stresses. It is also important that this elastomer coating be in the from of a uniform thin film adhering strongly to the substrate made of synthetic fabric which forms the walls of the airbag.

In order to prevent the gases released by the gas generator from getting into the passenger compartment, it is important to ensure that the airbag exhibits good and constant impermeability. The elastomer coating must also allow this objective to be achieved, even when deposited in small amounts.

Another constraint which is imposed on the elastomer coating is that of the ageing behaviour, i.e. the retention of the thermal, mechanical and adhesion properties over time. This constraint is all the more acute since the airbags are stored in folded form in motor vehicles, before their eventually life-saving expansion in the event of an accident.

As another criterion, one which is not negligible, it should be noted that the protective coating must not cause problems with regard to the manufacture of the airbag, which is by stitching.

Silicone compositions have easily supplanted chloroprenes in this application since it has turned out that the latter do not satisfactorily meet all the specifications referred to above. Compositions which can be used for airbag applications in motor vehicles are described, in particular, in EP-A-0,533,840 and U.S. Pat. No. 5,296,298.

According to EP-A-0,553,840, these known silicone compositions contain:

(A) a polydiorganosiloxane having at least two alkenyl groups per molecule,
(B) a polyorganohydrogenosiloxane having at least two hydrogen atoms linked to the silicon in each molecule,
(C) a metal catalyst, the metal being of the platinum group,
(D) an adhesion promoter consisting of an epoxy-functional organosilicon compound,
(E) an inorganic filler,
(F) a polyorganosiloxane resin, and
(G) optionally a compound used as a crosslinking inhibitor.

In U.S. Pat. No. 5,296,298, the aforementioned constituents (A) to (E) are again found but it should be noted that the adhesion promoter (D) consists here of the combination of an epoxy-functional organosilicon compound with an alkoxylated silane containing, per molecule, a (meth)acryl or (meth)acryloxy group and, optionally, with an aluminium chelate, while the inorganic filler (E) is given as being optional, although it is used in all the examples, 1 to 20, illustrating the invention.

However, the aforementioned known silicone compositions suffer from the drawback of not adhering sufficiently well to the polyamide fabric of the bag in order to guarantee optimum reliability, so very important with regard to road safety.

It is to the credit of the Applicant Company to have proposed in Document EP-A-0,681,014 a solution which aims to remedy the drawbacks of the prior art. The problematic at the basis of the invention claimed in this other document of the prior art is to obtain a silicone composition which can be applied in particular as an airbag inner coating and which, for this purpose, has the most favourable properties in terms of, in particular, fire and temperature resistance, mechanical properties, ageing behaviour, adhesion and surface uniformity, the adhesion to substrates made of textile material being most particularly desirable. The solution proposed by this invention consists in using:

a silicone coating composition of the type of those which are cold-curing (RTV) consisting of the mixture formed by:

(I) at least one polyorganosiloxane having, per molecule, at least two $C_2$–$C_6$ alkenyl groups linked to the silicon,
(II) at least one polyorganosiloxane having, per molecule, at least two hydrogen atoms linked to the silicon,
(III) a catalytically effective amount of at least one catalyst, composed of at least one metal belonging to the platinum group,
(IV) an adhesion promoter,
(V) optionally a mineral filler,
(VI) optionally at least one crosslinking inhibitor, and
(VII) optionally at least one polyorganosiloxane resin, in which the adhesion promoter consists exclusively of the at least ternary combination of the following ingredients:

(IV.1) at least one alkoxylated organosilane containing, per molecule, at least one $C_2$–$C_6$ alkenyl group,
(IV.2) at least one organosilicon compound which includes at least one epoxy radical,
(IV.3) at least one metal M chelate and/or one metal alkoxide of general formula: $M(OJ)_n$, with n=the valency of M and J=a linear or branched $C_1$–$C_8$ alkyl, M being selected from the group formed by: Ti, Zr, Ge, Li, Mn, Fe, Al and Mg.

A reinforcing filler such as a pyrogenic silica is always present in the experimental part of Document EP-A-0,681,014.

In some applications, in particular for manufacturing airbags, for reasons of economic competitiveness it is desired to apply very thin layers of silicone. The Applicant Company has found that coating compositions containing a reinforcing filler do not make it possible easily to obtain, using the conventional technique of the doctor-blade type, very low add-on weights of the coating layer such as, for example, those less than the value of about 30 g/m$^2$.

One object of the present invention is to propose a novel silicone coating composition which makes it possible to reduce the add-on weight of the coating layer without correspondingly changing the coating technique or the operation of the corresponding machine.

Another object of the present invention is to provide a novel silicone coating composition which makes it possible to obtain coatings whose add-on weight may easily be reduced, as required, down to a value as low as one less than approximately 30 g/m$^2$.

Yet another object of the present invention is to provide a novel silicone coating composition which makes it possible to obtain, compared with what happens with filled compositions, according to Document EP-A-0,681,014, having the same add-on weight, properties of the coated substrate, in particular with regard to:

fire and temperature resistance, which are at the very least equivalent, creasing and abrasion resistance (scrub test), which are improved, tear strength, which are also improved, thermal insulation, which are also improved.

These objects, among others, are achieved by the present invention which consists in selecting from all the possibilities offered in Document EP-A-0,681,014 the silicone coating compositions which include an adhesion promoter, containing exclusively the ingredients indicated in that prior art, which are not filled and which necessarily contain a polyorganosiloxane resin.

More specifically, a first subject of the present invention is a coating composition of the type of those which are cold-curing (RTV), characterized in that it is devoid of any reinforcing mineral filler and that it consists of the mixture formed by:

(1) at least one polyorganosiloxane having, per molecule, at least two $C_2$–$C_6$ alkenyl groups linked to the silicon, (2) at least one polyorganosiloxane having, per molecule, at least two hydrogen atoms linked to the silicon, (3) a catalytically effective amount of at least one catalyst, composed of at least one metal belonging to the platinum group, (4) an adhesion promoter comprising exclusively:

(4.1) at least one alkoxylated organosilane containing, per molecule, at least one $C_2$–$C_6$ alkenyl group, (4.2) at least one organosilicon compound which includes at least one epoxy radical, (4.3) at least one metal M chelate and/or one metal alkoxide of general formula: M(OJ)$_n$, with n=the valency of M and J=a linear or branched $C_1$–$C_8$ alkyl, M being selected from the group formed by: Ti, Zr, Ge, Li, Mn, Fe, Al and Mg, (5) at least one polyorganosiloxane resin, and (6) optionally, at least one crosslinking inhibitor.

This is a solventless composition.

In accordance with a preferred arrangement of the invention, the alkoxylated organosilane (4.1) of the promoter (4) is more particularly selected from the substances of the following general formula:

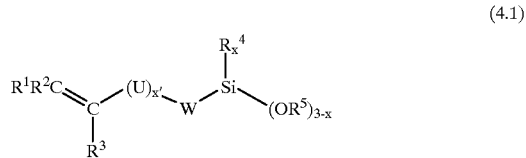

(4.1)

in which:

$R^1$, $R^2$, $R^3$ are hydrogen-containing or hydrocarbon radicals, which are the same or different from each other and represent, preferably, hydrogen, a linear or branched $C_1$–$C_4$ alkyl or a phenyl optionally substituted with at least one $C_1$–$C_3$ alkyl, U is a linear or branched $C_1$–$C_4$ alkylene, W is a valency bond, $R^4$ and $R^5$ are radicals, which are the same or different and represent a linear or branched $C_1$–$C_4$ alkyl, x'=0 or 1, and x=0 to 2, preferably 0 or 1 and even more preferably 0.

Without this being limiting, it may be considered that vinyltrimethoxysilane is a particularly suitable compound (4.1).

With regard to the organosilicon compound (4.2), provision is made according to the invention to select this:

either from the substances (4.2a) satisfying the following general formula:

(4.2a)

in which:

$R^6$ is a linear or branched $C_1$–$C_4$ alkyl radical, $R^7$ is a linear or branched alkyl radical, y is equal to 0, 1, 2 or 3, preferably equal to 0 or 1 and even more preferably equal to 0,

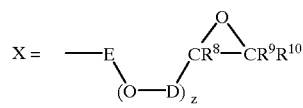

with

Δ E and D, which are the same or different radicals, selected from linear or branched $C_1$–$C_4$ alkyls, Δ z, which is equal to 0 or 1, Δ $R^8$, $R^9$, $R^{10}$, which are the same or different radicals, representing hydrogen or a linear or branched $C_1$–$C_4$ alkyl, hydrogen being more particularly preferred, Δ $R^8$ and $R^9$ or $R^{10}$ which may alternately constitute together, and with the two carbons containing the epoxy, a 5-membered to 7-membered alkyl ring, or from the substances (4.2b) consisting of epoxy-functional polydiorganosiloxanes comprising:

(i) at least one siloxyl functional unit of formula:

<br>
$$X_pG_qSiO_{\frac{4-(p+q)}{2}} \quad (IV.2\ b_1)$$

in which:
- X is the radical as defined above in the case of formula (IV.2a)
- G is a monovalent hydrocarbon group, free of any action unfavourable to the activity of the catalyst and selected, preferably, from the alkyl groups having from 1 to 8 carbon atoms inclusive, optionally substituted by at least one halogen atom, advantageously, from methyl, ethyl, propyl and 3,3,3-trifluoropropyl groups, and as well as from aryl groups, and advantageously, from xylyl, tolyl and phenyl radicals,
- p=1 or 2,
- q=0, 1 or 2,
- p+q=1, 2 or 3, and (2i) optionally at least one siloxyl functional unit of formula:

<br>
$$G_rSiO_{\frac{4-r}{2}} \quad (IV.2\ b_2)$$

in which G has the same meaning as above and r has a value of between 0 and 3, for example between 1 and 3.

Compounds (4.2) are preferably epoxyalkoxymonosilanes (IV.2a)

By way of such compounds (IV.2a), mention may be made of:
3-glycidoxypropyltrimethoxysilane (GLYMO), or
3,4-epoxycyclohexylethyltrimethoxysilane.

With regard to the essential final compound (4.3) of the adhesion promoter (4) of the (RTV) silicone composition according to the invention, the preferred substances are those in which the metal M is selected from the following list: Ti, Zr, Ge, Li, Mn. It should be emphasized that titanium is particularly preferred. It may be combined, for example, with an alkoxy radical of the butoxy type.

According to the invention, one advantageous combination for forming the adhesion promoter is the following:
vinyltrimethoxysilane (VTMS)/3-glycidoxypropyltrimethoxysilane (GLYMO)/butyl titanate.

Quantitatively, it may be specified that the weight proportions between (4.1), (4.2) and (4.3), expressed in percentages by weight with respect to the total of the three, are as follows:
- (4.1) ≧10, preferably between 15 and 70 and even more preferably between 25 and 65,
- (4.2) ≦90, preferably between 70 and 15 and even more preferably between 65 and 25,
- (4.3) ≧1, preferably between 5 and 25 and even more preferably between 8 and 18, it being understood that the sum of these proportions of (4.1), (4.2) and (4.3) is equal to 100%.

It has been possible to show that there is a correlation, on the one hand, between the adhesion performance and the structural performance of the silicone coating and, on the other hand, the weight ratio (4.2):(4.1). Thus, this ratio is preferably between 2:1 and 0.5:1, the ratio 1:1 being more particularly preferred.

Advantageously, the adhesion promoter is present in an amount of from 0.1 to 10, preferably 0.5 to 5 and even more preferably 1 to 3% by weight with respect to all of the constituents of the composition.

The composition according to the invention necessarily contains, in addition, at least one polyorganosiloxane resin (5) containing at least one alkenyl residue in its structure, and this resin has an alkenyl group(s) weight content of between 0.1 and 20% by weight and preferably between 0.2 and 10% by weight.

These resins are well-known branched organopolysiloxane polymers or oligomers available commercially. They are in the form of solutions, preferably siloxane solutions. They have, in their structure, at least two different functional units selected from those of formula $R_3SiO_{0.5}$ (M functional unit), $R_2SiO$ (D functional unit), $RSiO_{1.5}$ (T functional unit) and $SiO_2$ (Q functional unit), at least one of these functional units being a T or Q functional unit.

The radicals R are the same or different, and are selected from linear or branched $C_1$–$C_6$ alkyl radicals and $C_2$–$C_4$ alkenyl, phenyl 3,3,3-trifluoropropyl radicals. Mention may be made, for example, of: as alkyl radicals R, methyl, ethyl, isopropyl, tert-butyl and n-hexyl radicals and, as alkenyl radicals R, vinyl radicals.

It should be understood that in the resins (5) of the aforementioned type, some of the radicals R are alkenyl radicals.

As examples of branched organopolysiloxane polymers or oligomers, mention may be made of MQ resins, MDQ resins, TD resins and MDT resins, the alkenyl functional groups possibly being carried by the M, D and/or T functional units. As examples of resins which are particularly well suitable, mention may be made of vinyl MDQ resins having a vinyl-group weight content of between 0.2 and 10% by weight.

This compound (5) has the function of increasing the mechanical strength of the silicone elastomer coating, as well as its adhesion, within the context of coating the sides of a synthetic fabric (for example made of polyamide) stitched in order to form airbags. This structural resin is advantageously present in a concentration of between 10 and 70% by weight with respect to all of the constituents of the composition, preferably between 30 and 60% by weight and even more preferably between 40 and 60% by weight.

The polyorganosiloxane resin (5) will particularly preferably contain at least 2% by weight of $SiO_2$ functional units (Q functional units), in particular from 4 to 14% and preferably from 5% to 12%.

The polyorganosiloxane (1) is, weightwise, one of the main constituents of the composition according to the invention. Advantageously, this is a substance containing
(i) siloxyl functional units of formula:

<br>
$$T_aZ_bSiO_{\frac{4-(a+b)}{2}} \quad (1.1)$$

in which:
- T is an alkenyl group, preferably vinyl or allyl,
- Z is a monovalent hydrocarbon group, free of any action unfavourable to the activity of the catalyst and selected, preferably, from alkyl groups having from 1 to 8 carbon atoms inclusive, optionally substituted by at least one halogen atom, advantageously, from methyl, ethyl, propyl and 3,3,3-trifluoropropyl groups and as well as from aryl groups and, advantageously, from xylyl, tolyl and phenyl radicals,
- a is 1 or 2, b is 0, 1 or 2 and a+b is between 1 and 3, preferably between 2 and 3, and (2i) optionally other siloxyl functional units of formula:

$$Z_c SiO_{\frac{4-c}{2}} \tag{1.2}$$

in which Z has the same meaning as above and c has a value of between 0 and 3, preferably between 2 and 3.

It is advantageous for this polydiorganosiloxane to have a viscosity at least equal to 1000 mPa.s and preferably between 5000 and 200,000 mPa.s.

More preferably, this viscosity will be between 10,000 and 200,000 mPa.s, especially between 30,000 and 170,000, in particular between 40,000 and 120,000. Of course, in the case of a mixture of several oils (1) of different viscosity, the viscosity of the mixture is taken into account.

All the viscosities involved in the present document correspond to a dynamic viscosity quantity which is measured, in a manner known per se, at 25° C.

The polyorganosiloxane (1) may be only formed from functional units of formula (1.1) or may contain, in addition, functional units of formula (1.2). Likewise, it may have a linear, branched, cyclic or network structure.

Z is generally selected from methyl, ethyl and phenyl radicals, 60 mol. % (or 60% by number) at least of the radicals Z being methyl radicals.

Examples of siloxyl functional units of formula (1.1) are the vinyldimethylsiloxyl functional unit, the vinylphenylmethylsiloxyl functional unit, the vinylmethylsiloxyl functional unit and the vinylsiloxyl functional unit.

Examples of siloxyl functional units of formula (1.2) are $SiO_{4/2}$, dimethylsiloxyl, methylphenylsiloxyl, diphenylsiloxyl, methylsiloxyl and phenylsiloxyl functional units.

Examples of polyorganosiloxanes (1) are linear and cyclic compounds such as: dimethylvinylsilyl-terminated dimethylpolysiloxanes, trimethylsilyl-terminated (methylvinyl)(dimethyl)polysiloxane copolymers, dimethylvinylsilyl-terminated (methylvinyl)(dimethyl) polysiloxane copolymers and cyclic methylvinylpolysiloxanes.

The polyorganosiloxane (2) is preferably of the type of those which contain:
(i) siloxyl functional units of formula:

$$H_d L_e SiO_{\frac{4-(d+e)}{2}} \tag{2.1}$$

in which:
L is a monovalent, hydrocarbon group, free of any action unfavourable to the activity of the catalyst and selected, preferably, from alkyl groups having from 1 to 8 carbon atoms inclusive, optionally substituted by at least one halogen atom, advantageously, from methyl, ethyl, propyl and 3,3,3-trifluoropropyl groups, and as well as from aryl groups, and, advantageously, from xylyl, tolyl and phenyl radicals,
d is 1 or 2, e is 0, 1 or 2, d+e has a value of between 1 and 3, preferably between 2 and 3,
and (2i) optionally other siloxyl functional units of average formula:

$$L_g SiO_{\frac{4-g}{2}} \tag{2.2}$$

in which L has the same meaning as above and g has a value of between 0 and 3, preferably between 2 and 3.

The dynamic viscosity of this polyorganosiloxane (2) is at least equal to 10 mPa.s and preferably is between 20 and 1000 mPa.s.

The polyorganosiloxane (2) may be only formed from functional units of formula (2.1) or may contain, in addition, functional units of formula (2.2).

The polyorganosiloxane (2) may have a linear, branched, cyclic or network structure.

The group L has the same meaning as the group Z above.
Examples of functional units of formula (2.1) are:

$$H(CH_3)_2 SiO_{1/2}, HCH_3 SiO_{2/2}, H(C_6H_5)SiO_{2/2}$$

Examples of functional units of formula (2.2) are the same as those given above for the functional units of formula (1.2).

Examples of polyorganosiloxane (2) are linear and cyclic compounds such as:
hydrogenodimethylsilyl-terminated dimethylpolysiloxanes,
copolymers containing trimethylsilyl-terminated (dimethyl)(hydrogenomethyl)polysiloxane functional units,
copolymers containing hydrogenodimethylsilyl-terminated (dimethyl)(hydrogenomethyl)polysiloxane functional units,
trimethylsilyl-terminated hydrogenomethylpolysiloxanes, and
cyclic hydrogenomethylpolysiloxanes.

The ratio of the number of hydrogen atoms linked to the silicon in the polyorganosiloxane (2) to the total number of groups having alkenyl unsaturation in the polyorganosiloxane (1) and in the resin (5) is between 0.4 and 10, preferably between 0.6 and 5.

The polyaddition silicone composition bases may contain only linear polyorganosiloxanes (1) and (2) such as, for example, those described in Patents U.S. Pat. Nos. 3,220, 972, 3,697,473 and 4,340,709, or may contain both branched or network polyorganosiloxanes (1) and (2) such as, for example, those described in Patents U.S. Pat. Nos. 3,284, 406 and 3,434,366.

Preferably, the following are employed:
at least one linear polyorganosiloxane (1) containing chains formed from functional units of formula (1.2) in which c=2, these being blocked at each of their ends by functional units of formula (1.1) in which a=1 and b=2, and
at least one linear polyorganosiloxane (2) containing in its structure at least three hydrogen atoms linked to the silicon, these being located in the chains and/or chain ends.

Very preferably, the following are employed:
at least one linear polyorganosiloxanes (1) containing chains formed from functional units of formula (1.2) in which c=2, these being blocked at each of their ends by functional units of formula (1.1) in which a=1 and b=2, and
at least one linear polyorganosiloxane (2) containing chains formed from functional units of formula (2.1) in which d=1 and e=1 and, optionally, functional units of formula (2.2) in which g=2, these being blocked at each of their ends by functional units of formula (2.1) in which d=1 and e=2.

The catalysts (3) are also well-known. Preferably, platinum and rhodium compounds are used. In particular, it is possible to use complexes of platinum and of an organic substance described in Patents U.S. Pat. Nos. 3,159,601, 3,159,602, 3,220,972 and European Patents EP-A-0,057, 459, EP-A-0,188,978 and EP-A-0,190,530 and the complexes of platinum and of the vinyl organosiloxnes described in Patents U.S. Pat. No. 3,419,593, U.S. Pat. No. 3,715,334, U.S. Pat. No. 3,377,432 and U.S. Pat. No. 3,814,730. The catalyst generally preferred is platinum. In this case, the amount by weight of catalyst (3), calculated in terms of the weight of platinum metal, is generally between 2 and 400 ppm, and preferably between 5 and 200 ppm, these being based on the total weight of the polyorganosiloxanes (1) and (2).

Advantageously, the silicone composition according to the invention may also include at least one addition-reaction retarder (6) (crosslinking inhibitor) selected from the following compounds:

polyorganosiloxanes substituted with at least one alkenyl which may optionally be in cyclic form, tetramethylvinyltetrasiloxane being particularly preferred, pyridine, organic phosphines and phosphites, unsaturated amides, alkyl maleates, and alkynyl alcohols.

These alkynyl alcohols (cf. FR-B-1,528,464 and FR-A-2,372,874),which form part of the preferred thermal hydrosilylation-reaction blockers, have the formula:

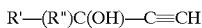

R'—(R")C(OH)—C≡CH in which formula:

R' is a linear or branched alkyl radical or a phenyl radical;

R" is H or a linear or branched alkyl radical or a phenyl radical, it being possible for the radicals R', R" and the carbon atom in the α position with respect to the triple bond optionally to form a ring;

the total number of carbon atoms contained in R' and R" being at least 5, preferably from 9 to 20.

The said alcohols are preferably selected from those having a boiling point greater than 250° C. By way of examples, mention may be made of:

1-ethynyl-1-cyclohexanol;

3-methyl-1-dodecyn-3-ol;

3,7,11-trimethyl-1-dodecyn-3-ol;

1,1-diphenyl-2-propyn-1-ol;

3-ethyl-6-ethyl-1-nonyn-3-ol;

2-methyl-3-butyn-2-ol; and 3-methyl-1-pentadecyn-3-ol.

These α-alkynyl alcohols are commercially available products.

Such a retarder (6) is present in an amount of at most 3000 ppm, preferably in an amount of from 100 to 1000 ppm with respect to the total weight of the organopolysiloxnes (1) and (2).

In a manner known per se, one or more conventional additive(s), such as colorants for example, may be added to the silicone elastomer composition.

According to another of these aspects, the present invention relates to a two-component precursor system for the silicone composition described hereinabove. Such a precursor system is in the form of two separate parts A and B, these being intended to be mixed together to form the composition, one of these parts A or B containing the catalyst (3) and only one of the species, (1) or (2), of polyorganosiloxane. Another characteristic of this precursor system is that its part A or B containing the polyorganosiloxane (2) is free of compounds (4.3) of the promoter (4) and that its part A or B which includes the compound (4.1) of the promoter (4) does not contain the catalyst (3). Yet another characteristic of this precursor system is that the resin (5) may be employed in part A or part B or in both parts A and B and that the catalyst (3) must not be present in the part A or B which contains the polyorganosiloxane (2) and the resin (5).

thus, part A may, for example, contain some of the polyorganosiloxane (1), the polyorganosiloxane (2), the compounds (4.1) and (4.2) of the promoter (4), some of the resin (5) and, optionally, the crosslinking inhibitor (6), while part B may, for example, contain the remaining part of the polyorganosiloxane (1), the catalyst (3), the compound (4.3) of the promoter (4), the remaining part of the resin (5) and, optionally, a colorant base.

The viscosity of parts A and B and of their mixture may be adjusted by varying the amounts of the constituents and by selecting polyorganosiloxanes of different viscosity.

Once parts A and B have been mixed together, they form a ready-to-use composition (RTV II) silicone, which may be applied to the substrate by any suitable coating means (for example a doctor blade or roller).

Although the composition applied to the substrate to be coated was able to crosslink cold (i.e. at a temperature close to room temperature, =23° C.), it should be noted that the compounds according to the invention may also be crosslinked thermally and/or by electromagnetic radiation (electron beam).

The compositions according to the invention may be used for covering or coating woven, knitted or non-woven fibrous substrates and, preferably, woven, knitted or non-woven substrates made of synthetic fibres, advantageously polyester or polyamide fibres.

The invention relates more particularly to the covering or coating of at least one of the sides of the flexible substrate material (polyamide fabric, for example) used for manufacturing, by stitching, airbags for the individual protection of the occupants of vehicles in the event of an impact.

Within this context, the compositions according to the invention prove to be noteworthy not only for coating substrates conventionally used in manufacturing airbags but also for coating, for this purpose, substrates having an open construction. Substrate having an open construction is understood to mean substrates having a porosity >15 l/dm²/min according to the DIN 53 887 standard. In the case of a fabric, the open construction may in particular be defined as corresponding to a number of warp and weft yarns per centimeter, the sum of which is less than or equal to 36.

As fabrics particularly recommended within the scope of the present invention, mention may be made in general of fabrics whose weight in the uncoated state is less than 200 g/m² and especially less than or equal to 160 g/m². Thus, mention may be made of such fabrics, especially polyamide fabrics, having from 16×16 to 18×18 yarns/cm, for example 470 dtex (decitex) fabrics having these characteristics.

It will be noted that it will also be possible to use substrates, especially fabrics, formed from high-performance textile fibres, that is to say textile fibres having enhanced properties with respect to conventional fibres, for example increased tenacity, so as to confer particular or enhanced properties depending on the applications of the coated substrate or fabric.

The Applicant Company has been able to demonstrate that the invention allowed cold-curing elastomers to be obtained which, once crosslinked, have the following characteristic:

relative density <1.1 (this may be measured, for example, by weighing a known volume or by picnometry or by a density-gradient column);

thermal conductivity at 23° C. (ASTM D 2326-70) $\leq 0.18$ W/m.K;

elastic property represented by the ratio between the tensile strength (in mPa, according to 53504 standard) of the crosslinked elastomer and the elongation at break (in %, according to the 53504 standard) of the crosslinked elastomer, this ratio being <0.02; and adhesion (NFG 37110), scrub $\geq 400$.

The best performance characteristics are obtained in the case of compositions which contain the oil (1) having a viscosity of between 10,000 and 200,000 mPa.s, especially between 30,000 and 170,000, in particular between 40,000 and 120,000, and resin (5) containing Q functional units, especially at least 2% by weight of such functional units, in particular from 4 to 14% and preferably from 5% to 12%.

The relative density obtained by the composition according to the invention makes it possible to produce thin-film coatings, advantageously less than or equal to 30 g/m$^2$, especially between 15 and 30 g/m$^2$ and preferably about 25 g/m$^2$. The elastic property of the elastomer enables the tear strength of the coated textile to be considerably increased. The low thermal conductivity of the elastomer gives the coated fabric first-order thermal protection, even with such a low coating thickness.

Other properties, such as pliability, adhesion of the elastomer to the fabric, gas impermeability, creasing and abrasion resistance, ageing behavior, stitchability and stitching integrity are also of a very high level.

In particular, it may be pointed out that the invention makes it possible to obtain a coated substrate exhibiting:

tear strength greater than or equal to 400 N (ASTM D 1682 standard);

thermal protection of the fabric improved by 30% compared with a standard silicone of greater relative density, for the same add-on weight; and porosity (DIN 53 887)<2 l/dm$^2$;min.

The subject of the invention is therefore also the use of a composition or of its precursor system, such as those described hereinabove, for covering or coating woven, knitted or non-woven fibrous substrates, especially those made of synthetic fibres, advantageously made of polyester or polyamide fibres.

According to one advantageous embodiment, the invention relates to the coating of a fabric having an open construction, according to the definition given above.

The subject of the invention is therefore also such a fibrous substrate coated according to the invention and therefore able to exhibit the characteristics and properties indicated above.

Preferably, the fibrous support is a fabric having an open construction. Preferably, the composition contains an oil (1) having a viscosity of between 10,000 and 200,000, preferably between 30,000 and 170,000, even more preferably between 40,000 and 120,000 mPa.a at 25° C. and a resin (5) containing Q functional units, preferably at least 2% by weight, especially from 4 to 14%, even more preferably between 5% and 12%. Also preferably, the add-on weight of elastomer is less than or equal to 30 g/m$^2$, especially about 25 g/m$^2$. The coated substrate advantageously has a weight of less than or equal to 200 g/m$^2$.

By virtue of the properties and characteristics indicated above, it is possible to produce airbags for the individual protection of the occupants of a vehicle based on fabrics having an open construction as described hereinabove, in particular polyamide or polyester fabrics, which, once coated, have a weight of less than or equal to 200 g/m$^2$ and possessing, moreover, optimum properties, especially tear resistance, thermal protection, porosity and pliability. This makes it possible to produce airbags which are lighter, have higher performance and are less expensive than bags produced from uncoated fabrics or from coated fabrics of the prior art.

The subject of the invention is also the use of a crosslinking silicone composition, especially of the cold- or hot-curing type, made of an elastomer having a relative density <1.1, a thermal conductivity at 23° C.$\leq 18$ W/m.K and the ratio between the tear strength and the elongation at break of which is <0.02, for coating a woven, knitted or non-woven fibrous substrate, especially for the purpose of producing airbags for protecting the occupants of vehicles. The invention relates here in particular to the coating of substrates having an open construction according to the definition given above, preferably with an elastomer thickness of less than or equal to 30 g/m$^2$, in particular of about 25 g/m$^2$, especially so as to obtain a coated substrate having a weight of less than or equal to 200 g/m$^2$. The invention also relates to the coated fibrous substrates thus obtained.

The invention relates in particular to the covering or coating of at least one of the sides of the flexible substrate material (polyamide fabric, for example) used for manufacturing, by stitching, airbags for the individual protection of the occupants of vehicles in the event of an impact.

However, it is well understood that the invention is not limited thereby and it may be employed in any application requiring similar properties. Mention may be made, for example, of tent fabrics, parachute fabrics and the like which could also draw benefit from some of the abovementioned properties, allied with lightness.

In general, the coating involved here may correspond to depositing a single layer on at least one of the sides of the flexible substrate material (primary coat). However, it may also involve depositing a second layer or optionally a third layer on at least one of the sides of the substrate material already coated (secondary coat) in order to have in total the desired thickness which guarantees the best possible performance characteristics in terms of impermenability.

The following examples, of preparation of the composition and of its application as a covering for a polyamide fabric, will enable the invention to be more clearly understood and will enable its advantages and its alternative embodiments to be apparent. The performance characteristics of the composition of the invention will be demonstrated below by comparative tests.

EXAMPLES

In these examples, the viscosity is measured using a RROOKFIELD viscometer according to the information in the AFNOR NFT 76 106 standard of May 1982.

Example 1

Example of the preparation of compositions
1. Preparation of an unfilled silicone composition according to the invention (composition C1)
  1.1 Preparation of part A of the two-component system
  The following are mixed in a reactor, at room temperature
  48 parts by weight of resin (5) having a MN$^{Vi}$DD$^{Vi}$Q structure containing 0.6% by weight of vinyl groups (Vi) and consisting of 17% by weight of $(CH_3)_3SiO_{0.5}$ functional units, 0.5% by weight of $(CH_3)_2ViSiO_{0.5}$ functional units, 75% by weight of $(CH_3)_2SiO$ functional units, 1.5% by weight of $(CH_3)ViSiO$ functional units and 6% by weight of $SiO_2$ functional units [this constituent being called resin (5) hereinafter];

30 parts by weight of a polyorganosiloxane (1) consisting of a polydimethylsiloxane oil terminated at each of the chain ends by a $(CH_3)_2ViSiO_{0.5}$ functional unit, having a viscosity of 100,000 mPa.s and containing 0.003 Vi-Si functional groups per 100 g of oil [this constituent being called hereafter high-viscosity oil (1)];

15 parts by weight of a polyorganosiloxane (1) consisting of a polydimethylsiloxane oil terminated at each of the chain ends by a $(CH_3)_2ViSiO_{0.5}$ functional unit, having a viscosity of 10,000 mPa.s and containing 0.005 Vi-Si residues per 100 g of oil [this constituent being called hereafter low-viscosity oil (1)];

5 parts by weight of a polyorganosiloxane (2) consisting of a poly(dimethyl)(hydrogenomethyl)siloxane oil terminated at each of the chain ends by a $(CH_3)_2HSiO_{0.5}$ functional unit, having a viscosity of 25 mPa.s and containing in total 0.7 H-Si functional groups per 100 g of oil (of which 0.6 H-Si functional groups lie within the chain) [this constituent being called hereafter oil (2)];

0.025 parts by weight of inhibitor (6) consisting of ethylcyclohexaol [this constituent being called hereafter inhibitor (6)];

1 parts by weight of compound (4.1) of the promoter (4), consisting of vinyltrimethoxysilane [this constituent being called hereafter VTMS (4.1)];

and 1 parts by weight of compound (4.2) of the promoter (4), consisting of 3-glycidoxypropyltrimethoxysilane [this constituent being called hereafter GLYMO (4.2)].

1.2 Preparation of part B of the two-component system

The following are mixed in a reactor at room temperature:

44.6 parts by weight of resin (5);

36.3 parts by weight of high-viscosity oil (1);

14.5 parts by weight of low-viscosity oil (1);

0.6 parts by weight of a colorant base, based on bromophthal blue referenced 4 GP, sold by the company CIBA GEIGY [this constituent being called hereinafter colorant base];

0.0215 parts by weight of platinum metal, introduced in the form of an organometallic complex containing 12% by weight of platinum metal, known by the name Earstedt catalyst [this constituent being called hereafter platinum of the catalyst (3)]; and 4 parts by weight of compound (4.3) of the promoter (4), consisting of butyl titanate $Ti(OBu)_4$ [this constituent being called hereafter $Ti(OBu)_4$ (4.3)].

1.3 Preparation of the two-component system

The two-components system is obtained by mixing, at room temperature, 100 parts by weight of part A and 10 parts by weight of part B. Composition C1 is thus obtained, the proportions of the constituents of which are indicated in Table I given below.

2. Preparation of a filled silicone composition acting as the control composition (composition C2)

2.1 Preparation of a primary coating material

The following are introduced into a planetary mixer:

35 parts by weight of resin (5);

29 parts by weight of ground quartz having an average particle size of about 2.5 μm and developing a BET surface area of about 3 m²/g, acid by the company SIFRACO [this constituent being called hereafter filler No. 1];

23.2 parts by weight of high-viscosity oil (1);

11.8 parts by weight of low-viscosity oil (1); and 1 part by weight of pyrogenic silica treated with octamethylcyclotetrasiloxane and developing a BET surface area of about 250 m²/g [this constituent being called hereafter filler No. 2].

2.2 Preparation of part A of the two-component system

The following are mixed in a reactor at room temperature:

94 parts by weight of the above coating material;

4 parts by weight of oil (2);

0.025 parts by weight of inhibitor (6);

1 parts by weight of VTMS (4.1); and 1 part by weight of GLYMO (4.2).

2.3 Preparation of part B of the two-component system

The following are mixed in a reactor at room temperature:

88.3 parts by weight of the above coating material;

7.6 parts by eight of high-viscosity oil (1);

0.1 part by weight of colorant base;

0.0215 parts by weight of platinum of the catalyst (3); and 4 parts by weight of $Ti(OBu)_4$ (4.3).

2.4 Preparation of the two-component system

The two-component system is obtained by mixing, at room temperature, 100 parts by weight of part A and 10 parts by weight of part B. The control composition C2 is thus obtained, the proportions of the constituents of which are indicated in Table I given below.

TABLE I

| | Compositions (parts by weight) | |
|---|---|---|
| | C1 | C2 |
| Resin (5) | 47.68 | 32.71 |
| High-viscosity oil (1) | 30.56 | 22.37 |
| Low-viscosity oil (1) | 14.96 | 11.02 |
| Oil (2) | 4.54 | 3.63 |
| Inhibitor (6) | 0.023 | 0.023 |
| Colorant base | 0.055 | 0.009 |
| Platinum of the catalyst (3) | 0.002 | 0.002 |
| VTMS (4.1) | 0.91 | 0.91 |
| GLYMO (4.2) | 0.91 | 0.91 |
| $Ti(OBu)_4$ (4.3) | 0.36 | 0.36 |
| Fillers No. 1 and No. 2 | — | 28.06 |
| Total | 100.00 | 100.00 |

Example 2

Example of an application as a covering for a polyamide fabric

1. Application protocol

The composition is deposited using doctor blades on fabrics based on nylon-6,6-type polyamide (polyhexamethyleneadipamide) having linear densities in decitex (dtex) which very and then, after coating, it is crosslinked, each time for 4 minutes at 150° C. in an oven sold by the company MATTHIS.

2. Results 2.1 Coating on a desired polyamide fabric of 235 dtex having 28.5×28.5 yarns/cm, and evaluation of the saving obtained, with regard to reduction in the add-on weight of the coating layer for the same setting of the coating blade and going from the control composition to the composition according to the invention:

TABLE II

| Composition | Add-on weight (g/m$^2$) | Saving in add-on weight (%) | Fire resistance (mm/min) (1) | Scrub test (number of scrubs) (2) |
|---|---|---|---|---|
| C2 | 31 | — | 75 | 500 |
| C1 | 25 | 20 | 85 | 1000 |

(1) The measurements are carried out according to the information in the FMVSS 302 standard ("Flammability Motor Vehicle Safety Standard").
(2) The creasing and abrasion resistance test (scrub test) (NF G 37110 standard) reflects the adhesion and ageing behaviour of the composition. This test consists in subjecting the fabric, on the one hand, to a shearing movement by means of two jaws which grip the two opposite edges of a test piece and which perform a to-and-fro motion one with respect to the other and, on the other hand, to abrasion by contact with a movable support.

2.2 Coating on a desired polyamide fabric of 470 dtex having 18×18 yarns/cm, i.e. a fabric having an open construction (porosity <15 l/dm$^2$/min), and evaluation of the fire resistance and the scrub test on going from the control composition to the composition according to the invention, for the same add-on weight of the coating layer

TABLE III

| Composition | Add-on weight (g/m$^2$) | Fire resistance (mm/min) (1) | Scrub test (number of scrubs) (2) |
|---|---|---|---|
| C2 | 32 | 60 | 300 |
| C1 | 32 | 57 | 1000 |

(1) and (2), cf. the information given above in Table II 2.3 Coating on a desired polyamide fabric of 470 dtex having 18×18 yarns/cm (open construction) and evaluation of the mechanical properties on the coated fabric on going from the control composition to the composition according to the invention

TABLE IV

| Composition | Add-on weight (g/m$^2$) | Tear resistance (1) (N) |
|---|---|---|
| C2 | 32 | 300 |
| C1 | 33 | 420 |

(1) The measurements are carried out according to the information in ASTM D 1682 standard.

2.4 The thermal conductivity of the solid silicone elastomers, prepared by crosslinking the compositions C1 and C2 at 150° C., was measured at two different temperatures according to the information in the ASTM D 2326-70 standard. The ratio between the tear strength [TS, in MPa] of the crosslinked elastomer and its elongation at break [$E_b$, in %] has also been measured [TS and Eb are evaluated according to the information in the DIN 53504 standard]

TABLE V

| Composition | Thermal conductivity (W/m.K) | | Relative density | TS/$E_b$ ratio |
|---|---|---|---|---|
| | at 23° C. | at 170° C. | | |
| C2 | 0.23 | 0.21 | 1.2 | 0.03 |
| C1 | 0.17 | 0.14 | 1.05 | 0.015 |

When the coated fabrics having the same thickness of compositions C1 and C2 are exposed to a high temperature, the protection afforded by composition C1 according to the invention is superior.

2.5 Coating on a desired polyamide fabric of 470 dtex having 16×16 yarns/cm (open construction) using composition C1 and a composition C3 defined below.

2.5.1 Composition C3
Part A of the two-component system:
The same as for part A in C1 except for the components (5) and (1) which become:

48 parts by weight of resin (5) having a MM$^{Vi}$DD$^{Vi}$Q structure containing 0.8% by weight of vinyl groups (Vi) and consisting of 27% by weight of $(CH_3)_3SiO_{0.5}$ functional units, 0.15% by weight of $(CH_3)_2ViSiO_{0.5}$ functional units, 60% by weight of $(CH_3)_2SiO$ functional units, 2.4% by weight of $(CH_3)ViSiO$ functional units and 9.6% by weight of $SiO_2$ functional units;

45 parts by weight of an organopolysiloxane (1) consisting of a polydimethylsiloxane oil terminated at each of the chain ends by a $(CH_3)_2ViSiO_{0.5}$ functional unit, having a viscosity of 100,000 mPa.s and containing 0.003 Vi-Si functional groups per 100 g of oil.

Part B of the component:
The same as for part B in C1 except for components (5) and (1) which become:
45 parts by weight of resin (5) as described in A;
51 parts by weight of oil (1) as described in A.
Preparation of the two-component system:
The same as C1.

2.5.2 Characteristics of the fabric and the coating
uncoated fabric weight: 160 g/m$^2$;
silicone add-on weight: 30 g/m$^2$.

2.5.3 Results
Properties of the crosslinked elastomer:
conductivity at 23° C. (ASTM D 2326-70 standard): 0.17 W/m.K for C1 and C3;
elongation at break (DIN 53504): 190% for C1; 250% for C3;
tear strength (ASTM D 624): 3 kN/m for C1; 9 kN/m for C3.
Properties of the coated fabric:
tear strength (DIN ASTM D 1682):
 fabric alone: 100 N;
 coated fabric: 450 N for C1 and C3.
creasing resistance at 30 g/m$^2$ (NF G 37110):
 800–1000 for C1;
 1500–1700 for C3.

2.6 Coating on a desired polyamide fabric of 470 dtex and with 21×20 yarns/cm, coated to 25 g/m$^2$ using composition C1 and composition C3
tear strength (ASTM D 1682):
 fabric alone: 210 N;
 fabric coated with C1: 550 N;
 fabric coated with C3: 520 N.

pliability (ASTM D 4032-94):
  fabric coated with C1: 15;
  fabric coated with C3: 9.

This pliability test reflects the flexibility of the fabric and its capacity to be folded up into a small volume (the lower the value, the better the pliability).

What is claimed is:

1. A coating composition, characterized in that it is devoid of any reinforcing mineral filler and that it consists of the mixture formed by:

(1) at least one polyorganosiloxane oil having, per molecular, at least two $C_2$–$C_6$ alkenyl groups linked to the silicon, (2) at least one polyorganosiloxane having, per molecule, at least two hydrogen atoms linked to the silicon, (3) a catalytically effective amount of at least one catalyst, composed of at least one metal belonging to the platinum group, (4) an adhesion promoter comprising exclusively,
     (4.1) at least one alkoxylated organosilane containing, per molecule, at least one $C_2$–$C_6$ alkenyl group,
     (4.2) at least one organosilicon compound which includes at least one epoxy radical,
     (4.3) at least one metal M chelate and/or one metal alkoxide of general formula: M(OJ)n, with n=the valency of M and J=a linear or branched C1–C8 alkyl, M being selected from the group formed by: T, Zr, Ge, Li, Mn, Fe, Al and Mg, (5) at least one vinyl MQ or a vinyl MDQ resin, containing in its structure from 0.1 to 20% by weight of an alkenyl group or groups, having a vinyl-group weight content of between 0.2 and 10% by weight, and from 4 to 14% by weight of Q functional units, said resin being in a concentration of between 10 and 70% by weight with respect to all the constituents of the composition, and (6) optionally, at least one crosslinking inhibitor.

2. Composition according to claim 1, characterized in that the vinyl MQ or the vinyl MDQ resin presents from 5 to 12% by weight of Q functional units, said resin being in a concentration of between 30 and 60% by weight respect to all the constituents of the composition.

3. A process for coating a woven, knitted or non-woven fibrous substrate comprising the step of coating said woven, knitted or non-woven fibrous substrate with a composition as defined in claim 1.

4. A process according to claim 3, wherein said woven, knitted or non-woven fibrous substrate forms airbags for protecting the occupants of vehicles.

* * * * *